United States Patent
Lee et al.

(10) Patent No.: US 10,545,995 B2
(45) Date of Patent: Jan. 28, 2020

(54) VALIDATING QUERY RESULTS DURING ASYNCHRONOUS DATABASE REPLICATION

(71) Applicant: SAP SE, Walldorf (DE)

(72) Inventors: Juchang Lee, Seoul (KR); Chang Gyoo Park, Seoul (KR); Hyejeong Lee, Seoul (KR); Kyu Hwan Kim, Seoul (KR); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 339 days.

(21) Appl. No.: 15/601,008

(22) Filed: May 22, 2017

(65) Prior Publication Data

US 2018/0336258 A1 Nov. 22, 2018

(51) Int. Cl.
*G06F 16/00* (2019.01)
*G06F 16/27* (2019.01)
*G06F 16/21* (2019.01)
*G06F 16/23* (2019.01)
*G06F 16/2455* (2019.01)
*G06F 11/36* (2006.01)

(52) U.S. Cl.
CPC ........... *G06F 16/273* (2019.01); *G06F 11/36* (2013.01); *G06F 16/219* (2019.01); *G06F 16/2358* (2019.01); *G06F 16/2379* (2019.01); *G06F 16/2455* (2019.01)

(58) Field of Classification Search
CPC ............. G06F 16/2322; G06F 16/2365; G06F 16/275; G06F 16/27; G06F 16/273; G06F 16/1865; G06F 12/0253; G06F 3/065; G06F 8/458; G06F 9/30087; G06F 9/3834; G06F 16/219; G06F 16/1873; G06F 11/1451; G06F 11/1658; G06F 16/23
See application file for complete search history.

(56) References Cited

U.S. PATENT DOCUMENTS 6,970,876 B2 * 11/2005 Hotti ..................... G06F 16/211
   707/634
2004/0213387 A1 * 10/2004 Chandrasekaran .........................
   G06F 16/2322
   379/93.24

(Continued)

FOREIGN PATENT DOCUMENTS

EP 2738697 A1 * 6/2014 ........... G06F 16/174

*Primary Examiner* — Augustine K. Obisesan
(74) *Attorney, Agent, or Firm* — Jones Day

(57) ABSTRACT

An oldest version timestamp is received from a first database. A current commit timestamp is received from a second database configured to asynchronously replicate the first database. The current global commit timestamp corresponds to a commit transaction executed in the first database and subsequently replicated in the second database. A first test query is then issued to the second database including a request for a current timestamp of the second database. A second test query is issued to the primary database requesting records associated with a target update version that has a target timestamp equal to the current snapshot timestamp. A determination is then made that a first return associated with the first test query and a second return associated with the second test query are identical indicating a successful validation. Related apparatus, systems, techniques and articles are also described.

20 Claims, 9 Drawing Sheets

(56) References Cited

U.S. PATENT DOCUMENTS

| | | | |
|---|---|---|---|
| 2006/0172724 A1* | 8/2006 | Linkert | G06Q 10/10 455/412.1 |
| 2007/0100783 A1* | 5/2007 | Cialini | G06F 16/217 |
| 2007/0255763 A1* | 11/2007 | Beyerle | G06F 16/275 |
| 2010/0192006 A1* | 7/2010 | Gharat | G06F 11/3688 714/5.1 |
| 2012/0197867 A1* | 8/2012 | Copty | G06F 11/3688 707/713 |
| 2014/0279920 A1* | 9/2014 | Madhavarapu | G06F 11/1458 707/649 |
| 2015/0261805 A1* | 9/2015 | Lee | G06F 16/2322 707/703 |
| 2016/0110439 A1* | 4/2016 | Hrle | G06F 16/273 707/600 |

\* cited by examiner

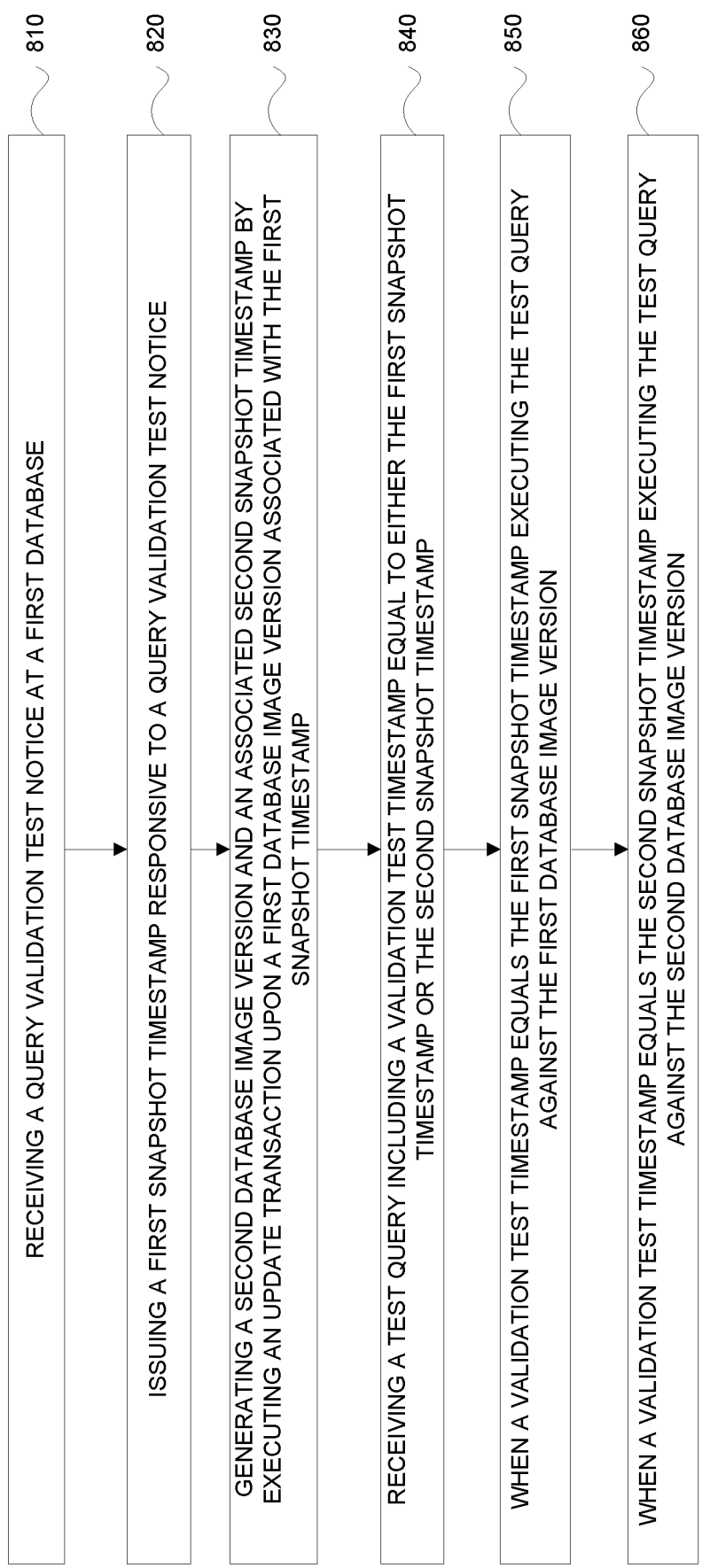

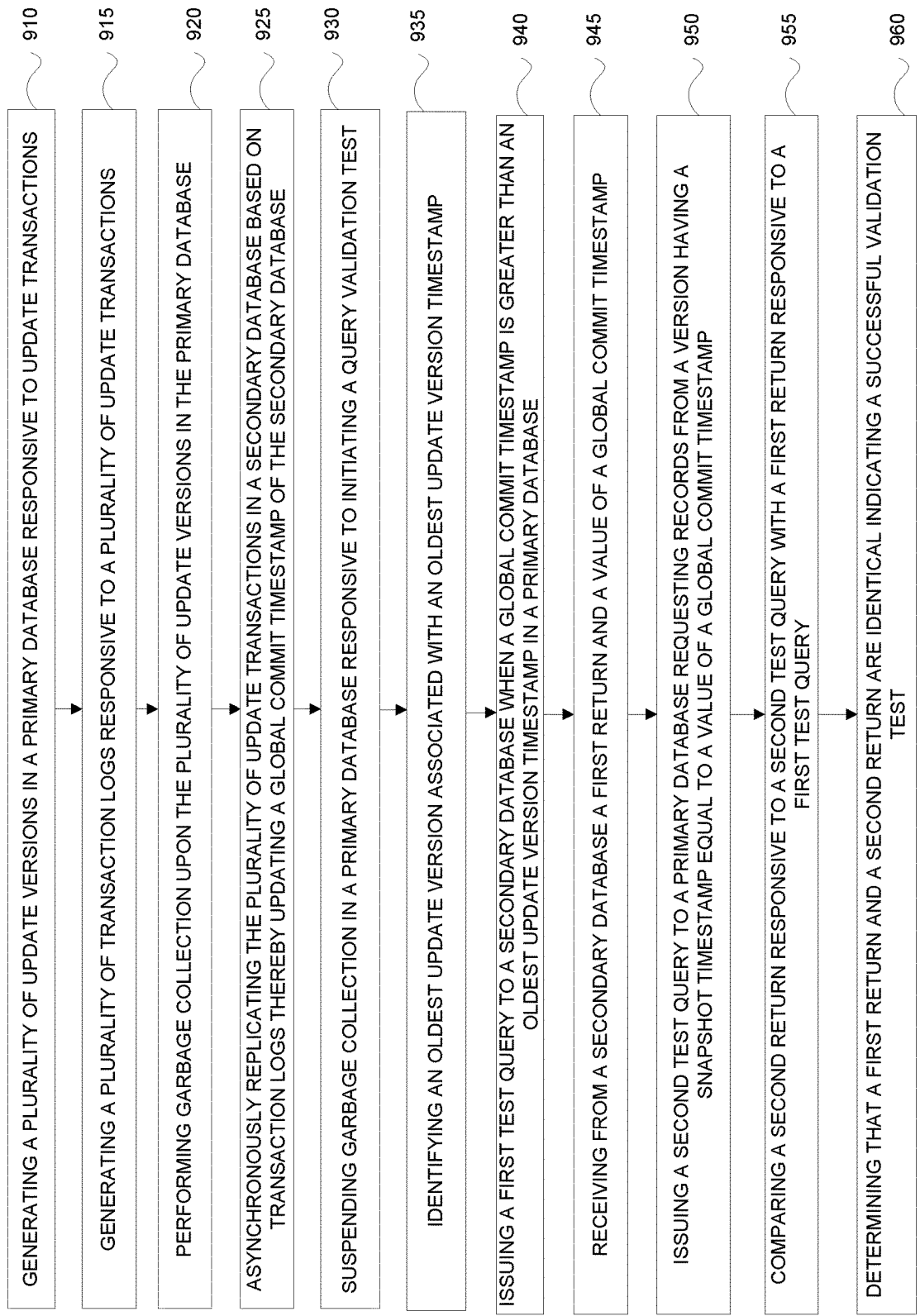

VALIDATING QUERY RESULTS DURING ASYNCHRONOUS DATABASE REPLICATION

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database system.

SUMMARY

In a first aspect, an oldest retained update version timestamp is received from a first database system. A current commit timestamp is received from a second database system that is configured to asynchronously replicate the first database system. The current global commit timestamp of the second database system corresponds to a commit transaction executed in the first database system and subsequently replicated in the second database system. Responsive to the current global commit timestamp being equal to or greater than the oldest retained update version snapshot timestamp, a first test query is issued to the second database system and includes a request for a current snapshot timestamp of the second database system. A second test query is issued to the primary database requesting records associated with a target update version that has a target snapshot timestamp equal to the current snapshot timestamp. A determination is then made that a first return associated with the first test query and a second return associated with the second test query are identical thereby indicating a successful validation.

A query validation test notice can be issued to a first database system thereby suspending garbage collection of update versions in the first database system. Such a query validation test notice may comprise an instruction causing the first database system to suspend garbage collection of update versions in the first database system. Garbage collection can include determining whether a particular update version is associated with any potential readers, and then deleting a particular update version that is not associated with any potential readers. Garbage collection of update versions in the first database system may resume responsive to a successful validation test.

The second database system may be configured to asynchronously replicate the first database system by receiving transaction logs generated by the first database system. The transaction logs may be generated responsive to the first database system executing update transactions such that some transaction logs are associated with a transaction commit timestamp. The transaction logs may be replayed after they are received by the second database system, thereby causing an update to the second database system that corresponds to a particular update executed in the first database system that caused the generation of a particular transaction log. The second database system may update its current global commit timestamp in response to replaying a particular transaction log by replacing a current global commit timestamp value with a transaction commit timestamp value associated with the particular transaction log.

The first return in response to the first test query may be converted to a first hash value generated based on first records in the second database system associated with the first test query. Similarly, the second return may be converted to a second hash value generated based on second records in the first database system associated with the second test query. And, determining that the first return and the second return are identical may involve comparing the first hash value and the second hash value.

In an interrelated aspect, a query validation test notice is received at a first database system comprising a first database image version. In response to receiving a query validation test notice, a first snapshot timestamp associated with the first database image version can be issued. An update transaction requiring one or more changes to records stored in the first database image version may be executed causing the generation of a second database image version based on at least the first database image version and the one or more changes to records required by the update transaction. The second database image version is associated with a second snapshot timestamp that is greater than the first snapshot timestamp. A test query may be received that includes a validation test timestamp equal to either the first snapshot timestamp or the second snapshot timestamp. When the validation test timestamp is equal to the first snapshot timestamp, the test query may be executed against the first database image version. And when the validation test timestamp is equal to the second snapshot timestamp, the test query may be executed against the second database image version.

A plurality of additional update transactions may be executed each causing additional changes to records stored in the first database image version, such that generating the second database image version is further based on the additional changes. For each additional update transaction, a corresponding additional database image version may be generated such that each additional database image version is associated with an additional snapshot timestamp greater than the first snapshot timestamp and less than the second snapshot timestamp. The additional changes to records stored in the first database image version may include changes to the table structure or database schema, in which case for each of the first database image version, the second database image version, or the additional database image versions any necessary table structure information or any necessary database schema is stored in order to enable executing queries against any one of the first database image version, the second database image version, or the additional database image versions.

The update transactions requiring one or more changes to records stored in the first database image version may be responsive to a statement received from a client application. Also, garbage collection of unnecessary database image update versions may be performed, where an unnecessary database image update version is not the most recent database update version and has no associated potential readers, and where garbage collection of the unnecessary database image update versions comprises deleting the unnecessary database image update versions. In response to the query validation test notice, the performance of garbage collection may be suspended.

When the validation test timestamp is equal to the first snapshot timestamp, records associated with the test query from the first database image version may be returned in response to the test query. And, when the validation test timestamp is equal to the second snapshot timestamp, records associated with the test query from the second database image version may be returned in response to the test query. An indication of a successful validation test may be received indicating that the returned records are identical to records obtained from a second database system that is configured to asynchronously mirror the first database system, and garbage collection of unnecessary database image update versions may resume. Resuming garbage collection may cause the first database image update version and the second database image update version to be deleted.

In an interrelated aspect, a plurality of update version snapshots are generated in a primary database system responsive to a plurality of update transactions. Each update version snapshot is associated with one of the plurality of update transactions and has a corresponding snapshot timestamp. A plurality of transaction logs responsive to the plurality of update transactions are generated, such that update transaction logs are associated with one of the plurality of update transactions and the corresponding snapshot timestamp. Garbage collection is performed upon the plurality of update versions in the primary database. Garbage collection deletes any update versions that are not a most current update version and that are not associated with a potential reader. The plurality of update transactions are replicated in a secondary database based on the plurality of transaction logs. Replication in the secondary database occurs asynchronously from the execution of the plurality of transactions in the primary database, and replication of a particular update transaction in the secondary database causes an update of a value of a current snapshot timestamp parameter in the secondary database with a particular snapshot timestamp value associated with the particular update transaction. In response to a query validation test, the garbage collection of the plurality of update versions in the primary database is suspended, and an oldest update version snapshot timestamp corresponding to the oldest retained update version of the plurality of update versions is identified. A first test query is issued against the secondary database when the secondary database current snapshot timestamp parameter is greater than or equal to the oldest update version snapshot timestamp. In response to the first test query, a first return is received from the secondary database that includes the value of the current snapshot timestamp parameter. A second test query is issued against a target update version in the first database, the target update version has a corresponding target snapshot timestamp equal to the value of the current snapshot timestamp parameter. A second return, responsive to the second test query, is compared with the first return, and a determination is made that the first return and the second return are identical thereby indicating a successful validation test.

A first hash value may be generated based on the first return, and a second hash value may be generated based on the second return. Comparing the second return with the first return may involve comparing the first hash value with the second hash value. The first test query and the second test query may be generated using only deterministic parameters. Each return, first and second, may be ordered by a specified parameter. Database structure information corresponding to an update version created prior to execution of the update transaction request may be stored in order to enable execution of test queries against the update version created prior to execution of the update transaction request, where the update transaction request requires modification of the first database structure.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads by enabling effective load balancing techniques for balancing the workload of a primary system with a backup database system. Protecting the amount of system resources available to replaying transaction logs at the secondary database or a backup database system may be maintained in a near current state with respect to a primary system that is under continuous use by one or more applications or users. Guaranteeing a minimum amount of system memory ensures that the log reply speed at the backup system can sustain the pace of log generation speed of a primary system under write-intensive workloads. By enabling near current and consistent transactional visibility of transactions that are replicated from a primary database the secondary database is able to assume a portion of the workload of a primary database system while also providing meaning returns in support of that workload. Without protecting system resources allocation to the replication processes, memory allocation to an intensive workload will may degrade the replication processes thereby causing a substantial delay between an update in the primary system and when that update is replicated in the secondary, or backup, system, and may make the secondary, or backup, database system ineffective in providing support to load balancing operations. The subject matter described herein allows a computer system to maintain consistent and useful, near-current, data visibility by a secondary database while data is updated and table structures are modified while concurrently replicating the of data the primary database system in the secondary database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a process flow diagram illustrating performing a query validation test; and FIG. 9 is a process flow diagram illustrating performing a query validation test.

Like reference symbols in the various drawings indicate like elements.

DETAILED DESCRIPTION

Figure 1:
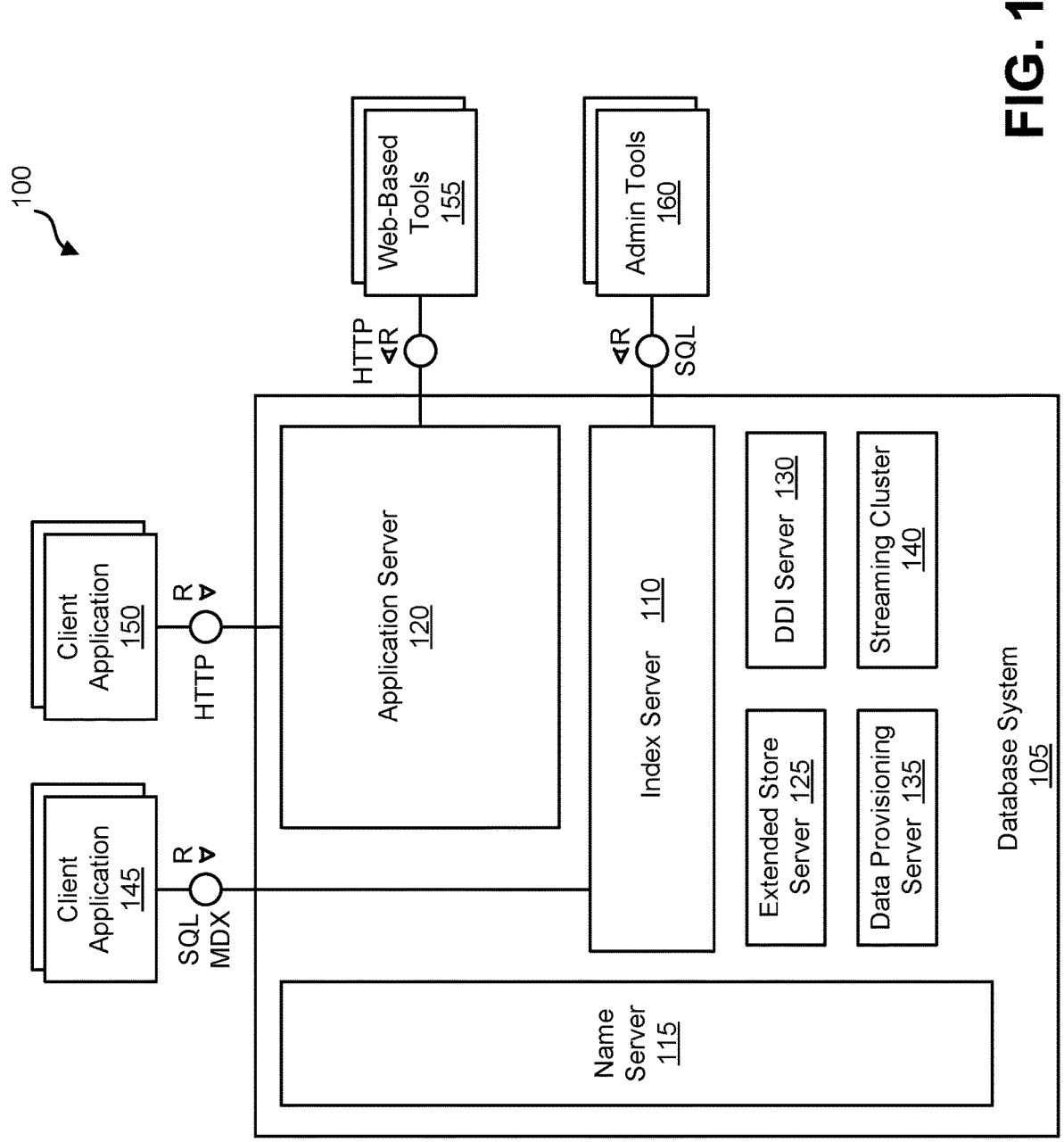
FIG. 1 is a system diagram illustrating an example database system for use in connection with the current subject matter.

The current subject matter is directed to techniques for validating a database system. In particular, techniques for validating a secondary database system operating as a high availability and disaster recovery ("HA/DR") backup database system in support of a primary database system, when that secondary database system is also configured to support primary database operation by engaging in load balancing operations with the primary database system. In such cases it is necessary to replicate the primary database system in the secondary database system. In order to ensure quality and reliable service system administrators must be able to validate database replication. One method of validating a replicated database is to issue an update statement to a primary database, and subsequently issue a read statement to read the results of the update statement in both the primary and secondary database systems, and then comparing those results. If the returns are identical then this supports validation of the replication processes of the HA/DR system. Having determined that a query validation test is successful the validation, or information indicating a validation, may be transmitted to an email address, one or more processes for further processing, or stored in memory or in a persistent data storage for later access by various processes, or a display notification may be generated and displayed on a computer display, for example a user interface.

A commercial database management system ("DBMS") may achieve more robust and efficient service under certain workloads by employing a technique called multi-version concurrency control ("MVCC"). In a database system employing MVCC, any updates to database records by transactions generate new versions rather than updating the existing record in place. Therefore, a series of versions are generated during the course of operation. Snapshot isolation is a technique for ensuring consistent read service, wherein a read transaction is assigned a specific version, or a snapshot, which is a current version created by a commit transaction. A snapshot can be assigned to each statement, or a snapshot can be assigned to a transaction and thereby be relied upon by each statement that occurs during a transaction. The decision to employ statement level or transaction level snapshots is left to a system designer or administrator based on available system resource and performance needs.

While a modern database system may operate with multiple terabytes of main memory, MVCC can suffer from excessive growth in the number of version created over time, thus leading to inefficiencies arising from memory mismanagement. Therefore, a system employing MVCC must reliably identify and delete obsolete versions, without risk to committed data or risk of interfering with other transactions or statements executing concurrently. Obsolete versions are versions that are no longer needed because there are no outstanding connections, statements, transactions or other readers that would potentially need to access them. The identification and deletion of obsolete, unneeded, database versions is called garbage collection.

When a backup database system mirroring a primary database system mirrors, or replicates, the primary database asynchronously, the backup database necessarily may encounter periods where its state lags behind the primary database. This is because an asynchronously replicated database only replicates transactions after those transactions have occurred in the primary database system. Thus, the current state of the backup database system may correspond to a state in the primary system associated with an older version than the most recent version in the primary system, or the current state of the backup system may correspond to an obsolete version in the primary system. As a result, there is no way to guarantee that a particular query executed at a primary database and at secondary database asynchronously replicating that primary database at any given time will return results from the same state, whether the replication processes are working properly or not.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory. To further improve performance, SAP HANA® also employs MVCC, and when a new version of the in-memory database image, or when new a version of records within the in-memory database image, are generated during an update transaction, those new image versions are appended to the in-memory database image.

Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (e.g., backup or redundant or replica) copy of the data associated with the database. In some implementations, the database may include more than two datacenters (e.g., three or four datacenters). In some implementations, either one or both of the databases is a distributed system or a single server system.

To better utilize the second (and subsequent) datacenter(s), some database systems, such as SAP HANA®, may simultaneously utilize the first datacenter and the second datacenter. In this mode of operation, the first datacenter may be configured to delegate, or route, queries to the second datacenter to balance the workload between the two systems. Such a situation may be referred to as Active/Active (AA) operation since the first datacenter and the second datacenter both actively respond to queries, or statements, at the same time by executing database operations responsive to the queries, or statements, in order to provide a response, or return. In some implementations only certain types of queries, or statements, may be responded to, or alternatively executed, by the first datacenter or the second datacenter.

In some implementations such balancing may only occur when conditions of the first datacenter and the second datacenter are satisfied. The second data center may replicate the first database of the first database center in a second database of the second data center. In an asynchronously replicated system, load balancing may only occur when the query results from a replicated second database are validated against a corresponding first database. In general, it is also useful for system administrators to be able to validate query results periodically, or subsequent to an update, upgrade, or other maintenance procedure performed on the database systems. In particular, the ability to validate a replicated database to ensure accurate and efficient returns is necessary in order to provide reliable load balancing operations, thereby increasing system throughput and maximum workload.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup, or replicated, database systems to execute queries to reduce the workload of a primary database system, while ensuring that the database systems return accurate and relevant results. When a query may be routed from a primary database to a secondary database, if the second database system's replication processes degrade or introduce errors in the replicated data, a return provided by the secondary database may be inaccurate or irrelevant by returning incorrect or untimely data.

When a secondary, or backup, database system serves the purpose of HA/DR functionality, an apparatus, system, technique or article that utilizes a secondary, backup database system to increase throughput of a workload on a primary database system must not interfere with the HA/DR functionality of the backup system. The use of the backup database system to increase throughput must also maintain the backup database in substantially the same state as the primary database. In the event of primary database system failure, the backup database can assume the role of the primary database in as little time as possible. Therefore, transactions replicated, or mirrored, to the secondary database must be as close to current as possible.

In a system that mirrors a primary database in a secondary database by transaction log reply, generation of and subsequent replay of transaction logs may not be able to keep pace with real time data transactions in a database system. Under heavy write-intensive workloads, replay of transactions executed in the primary by replay of transaction logs may be optimized by one or more techniques to minimize any delay, for example, transaction replication may be performed by various threads asynchronously operating on distinct dedicated logical cores of a multi-core processor. Because the replication processes execute asynchronously, there is no guarantee that updates to the primary database will be replicated in the same order as they are executed in the primary database system. In order to provide meaningful and useful workload support, a secondary system must be able to provide temporally consistent view into the data of the replicated database. One possible way of providing transactionally consistent view is by maintaining a global commit timestamp in the replicated database, which establishes the visibility of all transactions, by making visible all transactions committed in the replicated database before the global commit timestamp visible and making invisible all transactions not yet committed as of the global commit timestamp. The global commit timestamp may be associated with the most recently committed transaction in the replicated database system for which all previous transactions have been committed. As long as the secondary database presents consistent views into the data, it is acceptable that the replication may be slightly delayed. Determining what is an acceptable delay is left to a particular application designer.

While an acceptable amount of delay is permissible in the replicated database, a primary database system engaged in ongoing MVCC operations must perform efficient and timely garbage collection in order to properly control the number of versions held in main memory. Such efficient and timely garbage collection requires deletion of unnecessary and obsolete versions. The delay inherent in an asynchronously replicated database coupled with the need to perform timely garbage control necessitate employing techniques for validating query results in an asynchronously replicated database system.

FIG. 1 is a diagram 100 illustrating a database system 105 that can be used to implement aspects of the current subject matter. The database system 105 can, for example, include an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
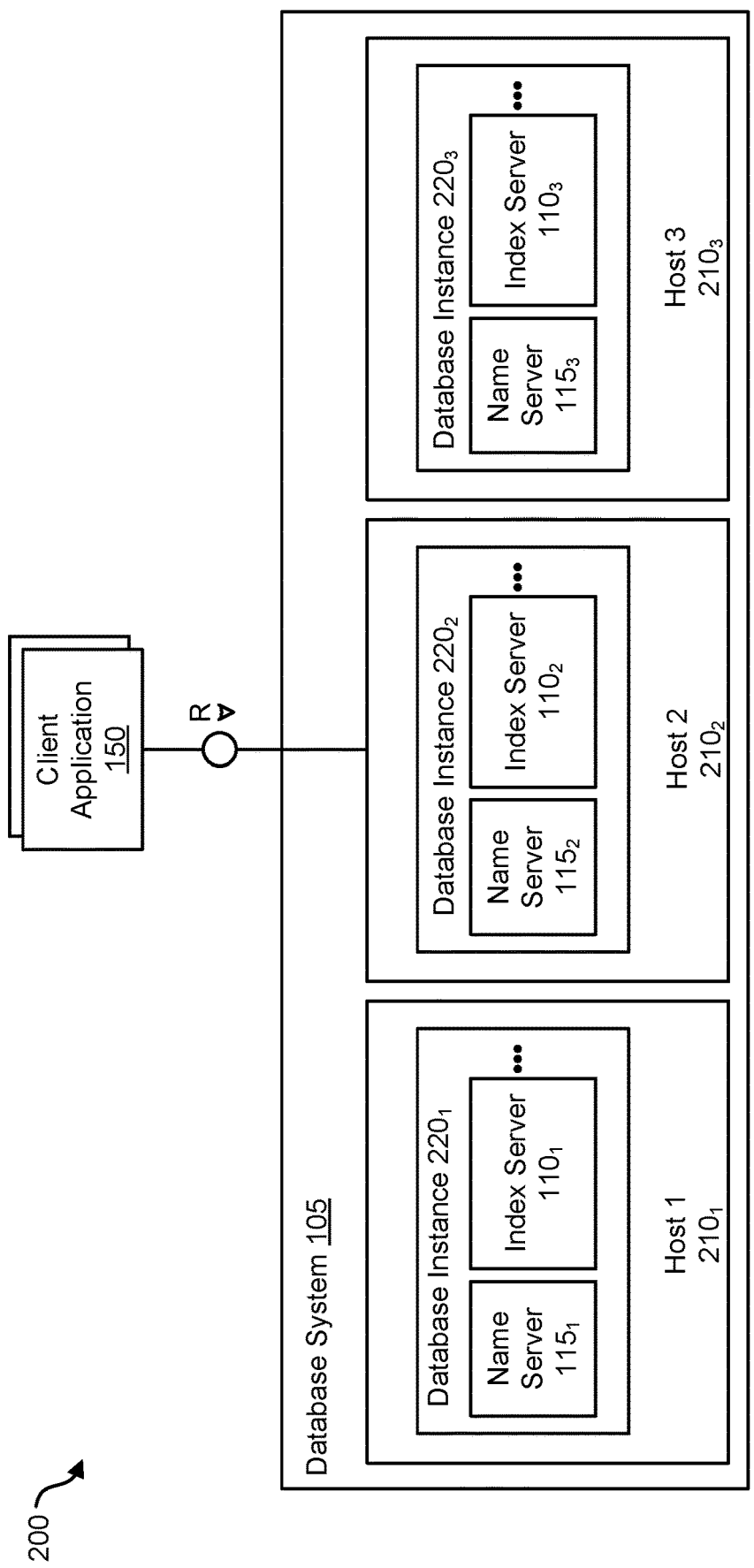
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1\text{-}3}$, $120_{1\text{-}3}$, in the system, if required.

As is illustrated in FIG. 2, the distributed database system 105 can be installed on more than one host $210_{1\text{-}3}$. Each host $210_{1\text{-}3}$ is a machine that can comprise at least one data processor (e.g., a CPU, etc.), memory, storage, a network interface, and an operation system and which executes part of the database system 105. Each host $210_{1\text{-}3}$ can execute a database instance $220_{1\text{-}3}$ which comprises the set of components of the distributed database system 105 that are installed on one host $210_{1\text{-}3}$. FIG. 2 shows a distributed system with three hosts, which each run a name server $110_{1\text{-}3}$, index server $120_{1\text{-}3}$, and so on (other components are omitted to simplify the illustration).

Figure 3:
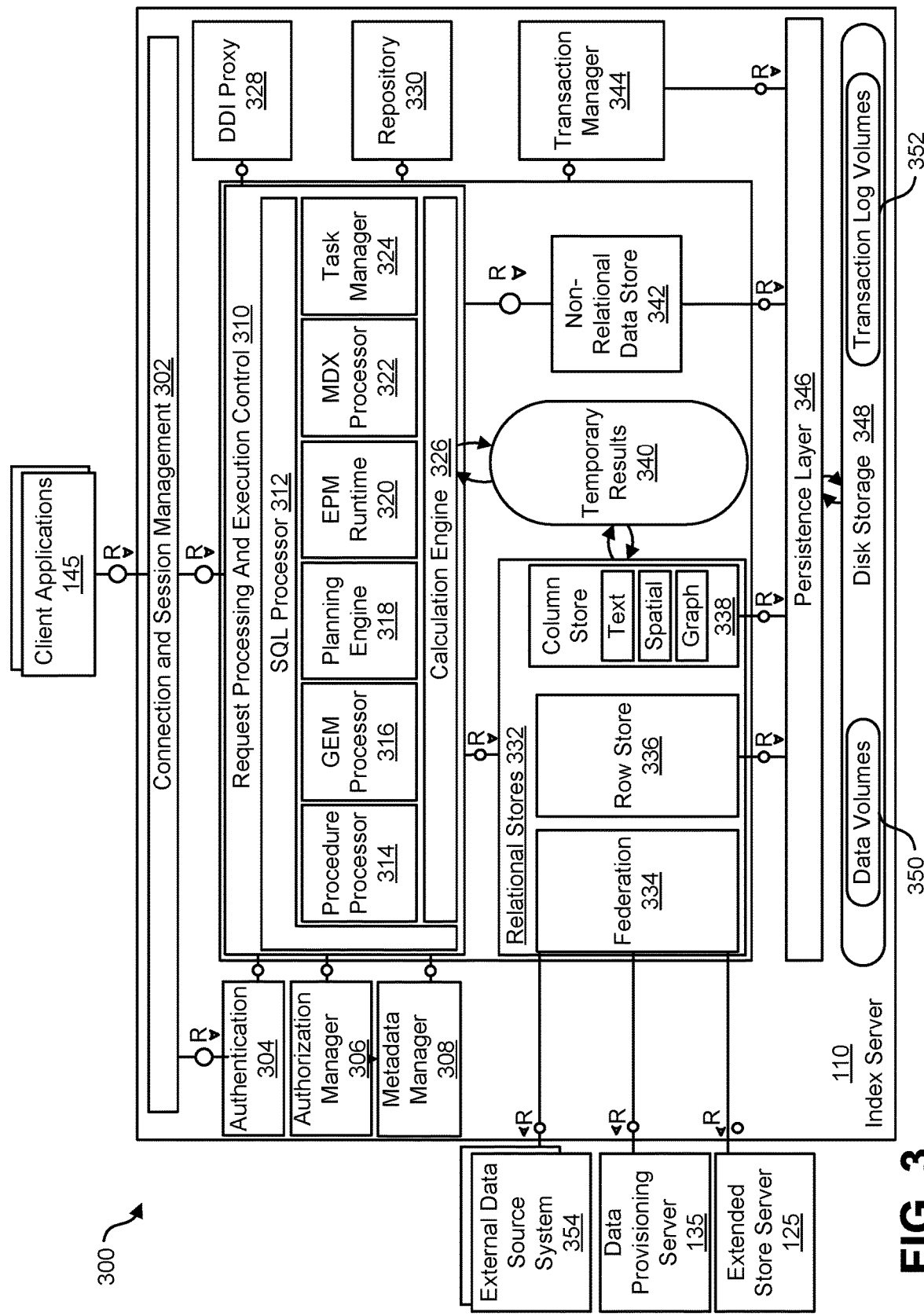
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked when a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written in the persistence layer 352 (e.g., in transaction log volumes 352) explicitly by using a log interface or implicitly when using a virtual file abstraction. The transaction log volume 352 can include redo logs which specify database operations to be replayed as well as undo logs which specify database operations to be undone.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems the hot-standby may replicate the primary system asynchronously, or one or more functions may be disabled until mission critical systems of the hot-standby are observed to be operating normally, at which time the remaining functions may be brought online and the asynchronously replicated transactions brought up to date, or at least as close to update as possible after a disaster occurs.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
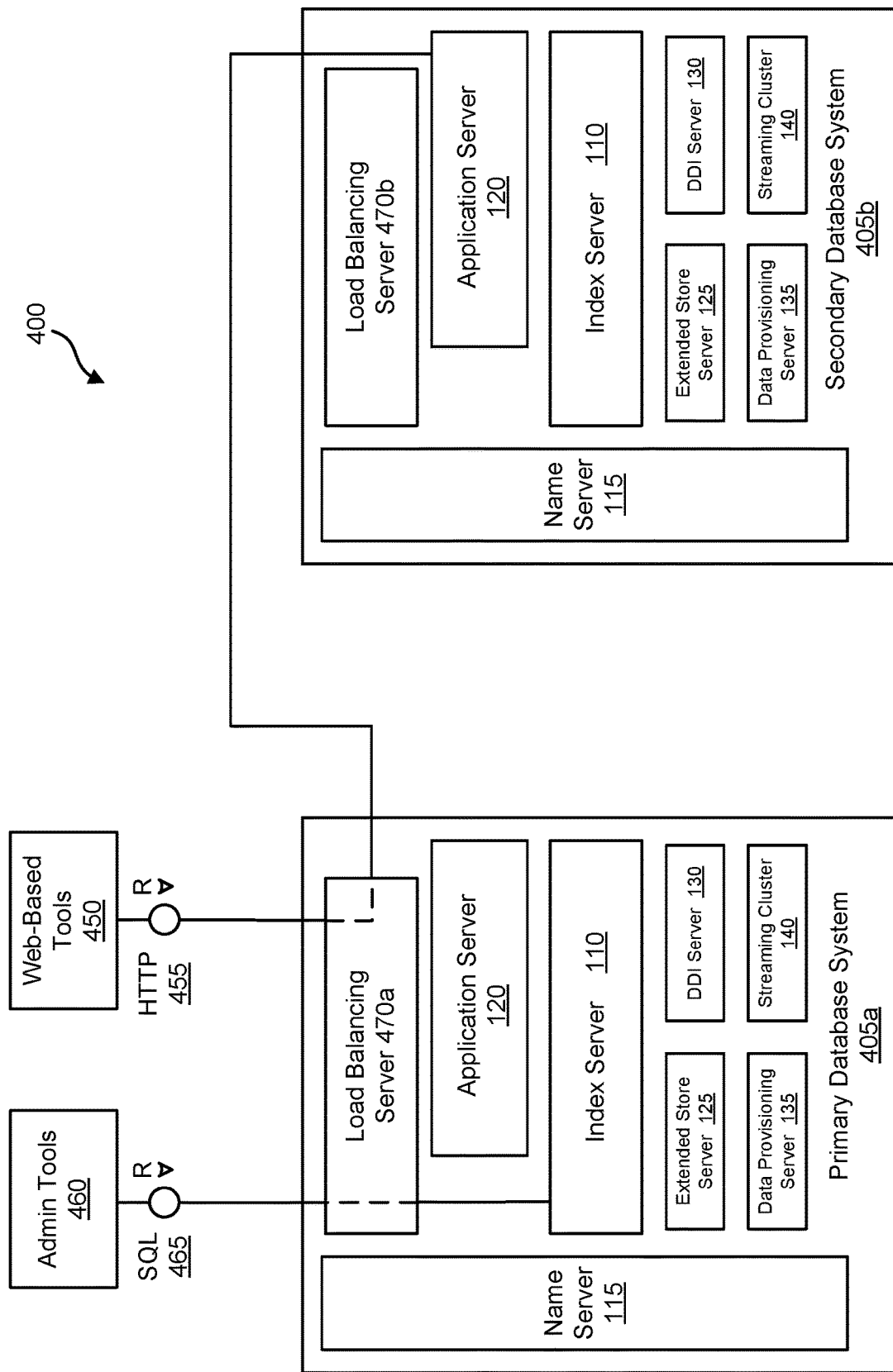
FIG. 4 is a functional flow diagram illustrating an architecture to support load balancing between a primary database system and a secondary database system.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405*a*, sending requests to the secondary system 405*b* as necessary to maintain a well distributed workload. The various load balancing processes operating in server 470*a* or 470*b* may be components of a larger DBMS system for managing the primary system 405*a* and secondary system 405*b*.

As depicted in FIG. 4, each of the primary system 405*a* and the secondary system 405*b* includes a load balancing server 470*a* and 470*b* which respectively receive requests from user applications directed to the primary system 405*a* or the secondary system 405*b*. Such request may come from either admin tools 460 or web-based tools 450, or any other user application. Upon receiving a request a load balancing server, e.g. 470*a*, determines how to distribute the workload. As depicted load balancing server 470*a* routes an SQL request 465 from admin tools 460 to the index server 110 of the primary system 405*a*, while routing an HTTP request 455 from web-based tools 450 to the application server 120 of the secondary system 405*b*.

Load balancing of resources between a primary system 405*a* and a secondary system 405*b* can give rise to a number of complicating issues. For example, if either of the requests 455, 465 requires writing to one or more data tables, or modifying a data table, then the two systems 405*a*, 405*b* will diverge. After many instances of write requests being distributed between the primary system 405*a* and the secondary system 405*b*, the two systems would be substantially different, and likely unusable. In another example, an application request, e.g. 465, may perform a write transaction that is followed by a read transaction, e.g. 455, related to the data written by the write request 465. If the write request is allocated to the primary system 405*a*, the read request would obtain a different result depending on whether the subsequent read transaction is carried out by the primary system 405*a* or by the secondary system 405*b*.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
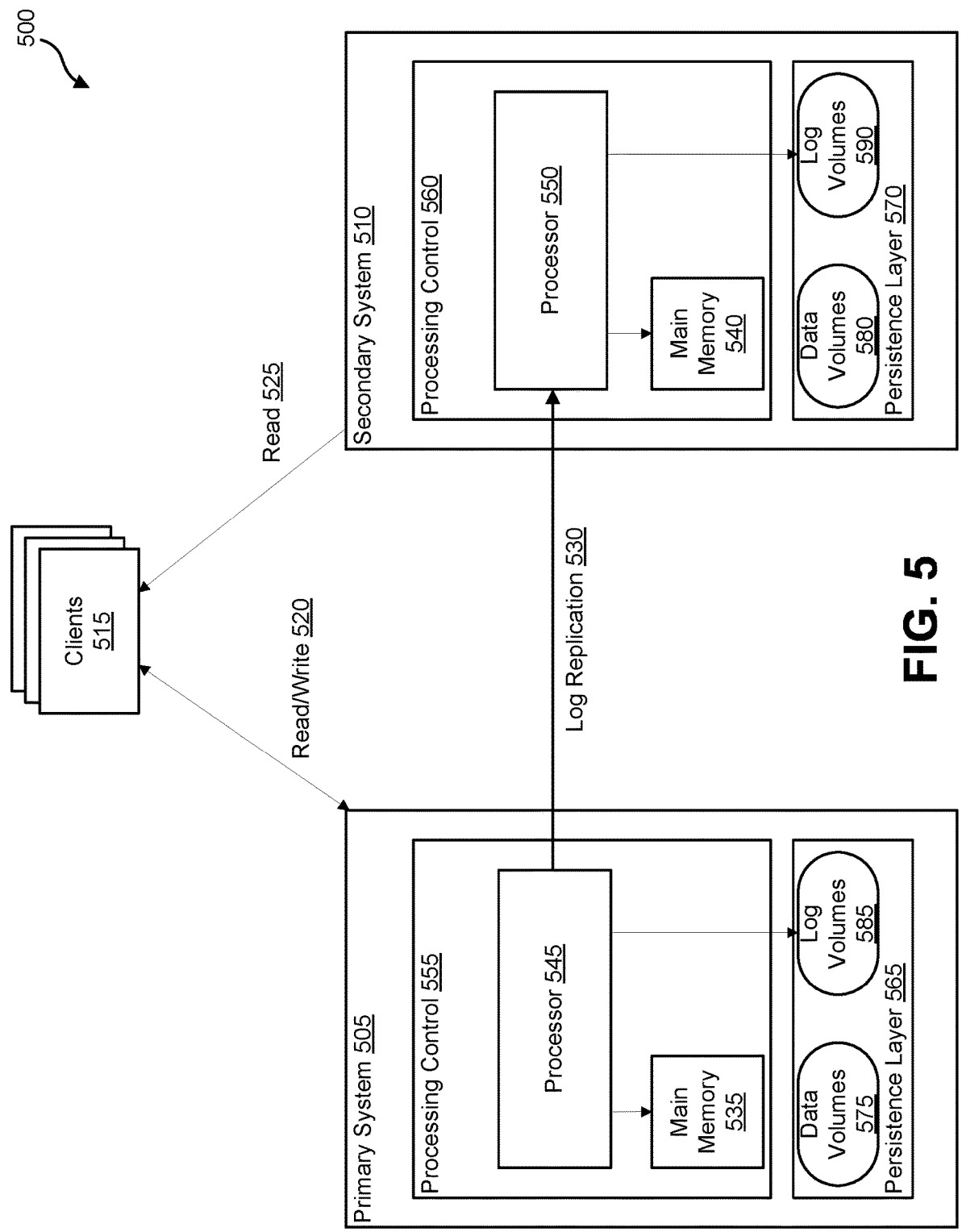
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510. These various components may comprise a DBMS system for controlling the HA/DR system 500 and constitute various processes and components executing within processing control 555, 560 and the persistence layer 565, 570. The DBMS system therefore interacts with and maintains the database as it is held in main memory 535, 540 and persisted in the persistence layer 565, 570.

A collection of clients may each maintain an open connection to both the primary system 505 and the secondary system 525. Clients 515 may interact with a database managed by the primary system 505 or the secondary system 510. Such clients may interact through client applications or through components of the DBMS system executing at the client 515. In other cases, the clients may rely on a client application library containing various processes and techniques for interacting with the database systems. For example, a client 515 maintains a read/write connection for issuing read and write statements 520 to the primary system 505 and a read only connection for issuing read statements 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. In embodiments read/write statements 520 are issued to the primary database system 505, while only read statements 525 are issued to the backup, or secondary, database system 510. Clients 515 may perform query validation tests upon an HA/DR system relying on a DBMS component, a client library, or other processes.

In embodiments load balancing of the workload required by a client application executing at client 515 is managed by the client 515 application itself. Alternatively, a client 515 application may submit a query request to either the primary system 505 or the secondary system 510 with routing data indicating that the statement may be load balanced, or routed to the secondary database system 505, and including one or more routing conditions. Process control 555, 560 load balancing processes executing on processor 545, 550 may then determine where the query should be executed and replies to the client 515 with instructions identifying which system the client 515 should issue the query to. This determination may consider various conditions related, among other things, to the state of a primary database system 505 or a state of the secondary database system 510. For example, the determination to perform a load balancing operation may consider when the most recent query validation test was performed, or the results of a query validation test.

Primary system 505 may include an in-memory database in which substantially all actively used data may be kept and maintained in main memory 535 so that operations can be executed without disk I/O, which requires accessing disk storage. As statements are execute the in-memory database is updated with new update versions by various database operations caused by received statements. A new version may be generated in main memory 535 independent of other versions, or a new version may be appended to earlier versions in main memory 535. In embodiments, these database operations also generate transaction logs which are shipped to the secondary system 510 for replication 530 in the secondary database system 510. During replication the secondary database system 510 mirrors the primary database system 505. When the secondary database system 510 includes an in-memory database that is mirrored from the primary database is, the secondary database system's in-memory database is delayed from the primary in-memory database. In embodiments, applications that rely on the primary database system 505 may allow for transactions to be executed in the replicated or mirror database at the secondary database system 510. These applications may impose conditions on the statements they execute.

In embodiments, primary system 505 may be the primary operational system for providing the functionality necessary to support 24/7 operations for an organization. The primary database system 505 employing MVCC provides an incoming statement 520 from a client 515, or otherwise, a current snapshot based on the most recently committed update version. When asynchronously replicated, the secondary database system 510 may provide an incoming statement, e.g. 525.

Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

In embodiments, primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs to the process control 560 of the secondary system 510. Processes in process control 560 may first persist the transaction logs in the persistence layer. Process control 560 includes processes that cause processor 550 to replay the transaction logs replicated from the primary system 505, thereby replicating or mirroring the transactions or data at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in transaction logs being persisted in log volumes 590.

Transaction logs (e.g., redo logs, undo logs, cleanup logs, commit logs, savepoint logs, heartbeat logs, etc.) may be replicated 530 in different ways. In embodiments, a standby system is maintained in nearly the same state as the primary system, and logs may be replicated synchronously meaning that the primary system will not commit a transaction until the secondary successfully responds to the log replication. Such an arrangement slows performance of the primary system 505, 405*a*. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data. When asynchronously replicated, the secondary database system 510 may provide an incoming statement, e.g. 525, a delayed snapshot version. An example of a delayed snapshot is one having visibility into the secondary database systems's in-memory database based on a global commit timestamp. The global commit timestamp in an asynchronously replicated secondary database is a value corresponding to a commit timestamp of a replicated commit transaction, relative to which all previous commit transactions of the primary database have been replicated in the secondary database system. This is necessary because replication processes may not enforce a strict ordering of transaction replication, for example when replication occurs in a parallel processing configuration such that transactions are assigned to a replication queue without regard to the order in which they were created. The global commit timestamp in other words may be a current snapshot timestamp, that is a timestamp dictating the current visibility of records within the secondary database. This is a global variable in the secondary database system representing a time associated with when the underlying transaction was committed in the primary database system before being replicated in the secondary database system.

A secondary system in standby mode, such as secondary system 510, can only be as current as its most recently replayed transaction logs. Transaction logs are replicated and replayed at the secondary system 510 only after a transaction executes in the primary system 505. To ensure consistent returns in a secondary system 510, the global commit timestamp may only be updated to the most recent commit timestamp for which every earlier transaction in the primary database has been committed in the secondary database. Secondary system 510, therefore, is often slightly behind an associated primary system 515 except when there is no workload at the primary database system during which time the replication processes may catch up to the primary database system. Also, there is no guarantee that a query routed to the primary system in a load balancing effort will be executed before, during or after a particular transaction log is replayed. Thus, the state of the primary system 505 and the state of the secondary system 510 will rarely if ever be identical. But, by addressing certain concerns, a replicated system, or secondary system, 510 may be kept in a state substantially close to the state of the primary system 505 such that the workload required by many operations can be supported by the secondary 510.

As discussed above, when a secondary, or backup, database system 405*b*, 510 serves the purpose of HA/DR functionality, and a load balancing operation simultaneously utilizes the secondary, backup, database system 405*b*, 510 to increase throughput of a workload on a primary database system, to ensure consistent and accurate returns the load balancing operations demand that queries executed on the secondary database system be validated against the primary database system from time to time. This may be done automatically, according to a schedule, or manually tested by a user through a user interface.

When a delay develops between the primary system and the secondary system, a query executed in the primary system, e.g. 505, may obtain different results from the exact same query executing in the secondary system, e.g. 510, as the exact same time. In such a case, the visibility of the data within each database is different by virtue of the replication process. What is visible to queries, or statements, executed in the primary database at t[n] may only be available in an associated database at a later time t[n–d] where d is the delay. In embodiments, the visibility of data (i.e. what a query may return by virtue of what has been committed to the particular database) is referred to as a snapshot. When a query, or statement, is received, that query is presented a snapshot of the database at the time the query is received, and the basis for the return to the query is the snapshot. In many cases, a delay between a snapshot in the primary database 505 and the same snapshot in the secondary database 510 may be acceptable so long as the results are consistent and the delay is within an allowable length of time as determined by the application or system designer. This delay, however, complicates attempts to validate queries executed in the secondary database 510, for example to ensure that the replication process is correctly replicating every transaction from the primary database and presenting consistent visibility of those transactions in the secondary database.

A solution to this problem of how to validate queries must account for the delay between a primary and secondary database system, and for ongoing garbage collection procedures. Because each commit update transaction in the primary database creates a new update version, and because each update of a current snapshot timestamp in the secondary database corresponds to a commit update transaction in the primary database, albeit delayed from transaction execution in the primary database, every update to the current snapshot timestamp, or global commit timestamp, in the secondary system corresponds to a version that has been generated in the primary system. But, because of necessary garbage collection of obsolete versions in an MVCC implemented system, a version in the primary system corresponding to the current snapshot timestamp of the secondary database may already have been deleted.

To perform query validation in an asynchronously replicated database system such as 400 or 500, performing load-balancing operations between a primary database system and a secondary database system, first garbage collection of update versions must be suspended. A query validation test may be initiated by any computer processor communicatively coupled to the HA/DR system. That is, it may be a process executing in processor 545 or processor 550 or it may be a process executing at a client computer 515. Garbage collection may be a process within process control 555 executing on processor 545 based on instructions held in main memory 535. A query validation test first disables garbage collection, for example when initiated by a client 515 a query validation test notice message is sent from client 515 to a process within processing control 555 that then initiations garbage collection suspension. Alternatively, client 515 may actuate one or more controls or update a parameter within primary system 505 that causes a suspension of garbage collection directly. When suspending garbage collection, it may be suspended indefinitely, waiting until the test is complete to resume, or garbage collection may be suspended for a defined period of time as determined by a system designer, or administrator.

When garbage collection is suspended, update versions are retained in main memory 535 potentially indefinitely, until garbage collection resumes. Responsive to a query validation test notice, process control 555 may automatically respond to client 515 with the oldest retained version snapshot timestamp. An oldest update version corresponds to the oldest update version generated by a committed update transaction in the primary database, which may be an update caused by an insert statement. The oldest update version timestamp is a value indicative of when in time the update transaction occurred. The update transaction that caused the oldest update version also results in a transaction log that is transmitted sometime after the commit occurs, to be replicated asynchronously in the secondary systems 510 in-memory database held in main memory 540.

Once garbage collection is suspended, and a client 515 has received an oldest update version snapshot timestamp, the client 515 waits until the global commit timestamp of the secondary system 510 is equal to or greater than the oldest update version snapshot timestamp received from the primary system 505 beore issuing a test query. The client 515 may obtain the global commit timestamp by issuing query statements invoking specific SQL functions to the secondary system 505 until the global commit timestamp of the secondary system 510 greater than the oldest update version snapshot timestamp, or alternatively, the client may issue the secondary system 510 a query validation test notice, causing the secondary system 510 to send the global commit timestamp to the client 515 whenever it is updated. In other embodiments, the secondary system 510 may always update clients 515 with the global commit timestamp as part of normal operations. The client 515 waits until the global commit timestamp of the secondary system 510 is equal to or greater than the oldest update version snapshot timestamp to ensure that the test query is not executed against a secondary system 510 state that corresponds to an update version in the primary system 505 that has already been deleted prior to suspending garbage collection.

Once the global commit timestamp, or current snapshot timestamp, of the secondary system 510 exceeds the oldest update version snapshot timestamp obtained from the primary system 505, a client 515 issues a test query, or a statement including a test query, against the secondary system. The query may include information informing the secondary system 510 that it is a test query, for example, by including additional hint information attendant to the query, or the test query may appear to the secondary system 510 as any other test query. The test query statement will include at least one read transaction in order to obtain test results that may later be compared with results from the primary system, and the test query will include a request for (either explicitly or impliedly when the secondary system is aware that the query is a test query) the current snapshot timestamp of the secondary system 510. This is to account for the fact that the global commit timestamp may increment between when the client 515 confirms the global commit timestamp exceeds the oldest update version snapshot timestamp and when the secondary system 510 executes the test query transaction.

After receiving a return from the secondary system 510 responsive to the test query and a corresponding current snapshot timestamp associated with the return, a client 515 may then issue a test query to the primary database. The test query to the primary system 505 is the same query as the test query issued to the secondary system 510 attended by the secondary system 510 global commit timestamp obtained with the return provided by the secondary system 505 in response to the test query. The primary system 505, upon receiving the test query with the secondary system 510 global commit timestamp, or the current snapshot timestamp, then identifies the retained update version that corresponds to the global commit timestamp, and executes the test query on that retained update version. The return is then provided to the client 515 from the primary system 505. In embodiments, normal database operations may prohibit such a targeted query; that is one that targets a specific update version. But, responsive to a validation test notice, or by setting a validation test flag, the primary system may suspend enforcing the prohibition against update version targeted queries. Alternatively the snapshot timestamp from the secondary database 510 may be supplied to the primary system 510 for example by a specialized SQL hint that indicates to the primary system 510 that the query is a test query, targeting a specific update version, and that for the purposes of the test query, the prohibition should be temporarily suspended.

The client 515, having obtained a return from the secondary database and the primary database, each responsive to the same test query, and each executed presumably against a same snapshot (assuming the system is operating correctly), next compares the returns from each system responsive to the test query. If the returns are identical, the HA/DR processes including the replication processes are validated. Having determined that a query validation test is successful, the validation, or information indicating a validation, may be transmitted to an email address, one or more processes for further processing, or stored in memory or in a persistent data storage for later access by various processes, or a display notification may be generated and displayed on a computer display, for example a user interface.

Figure 6:
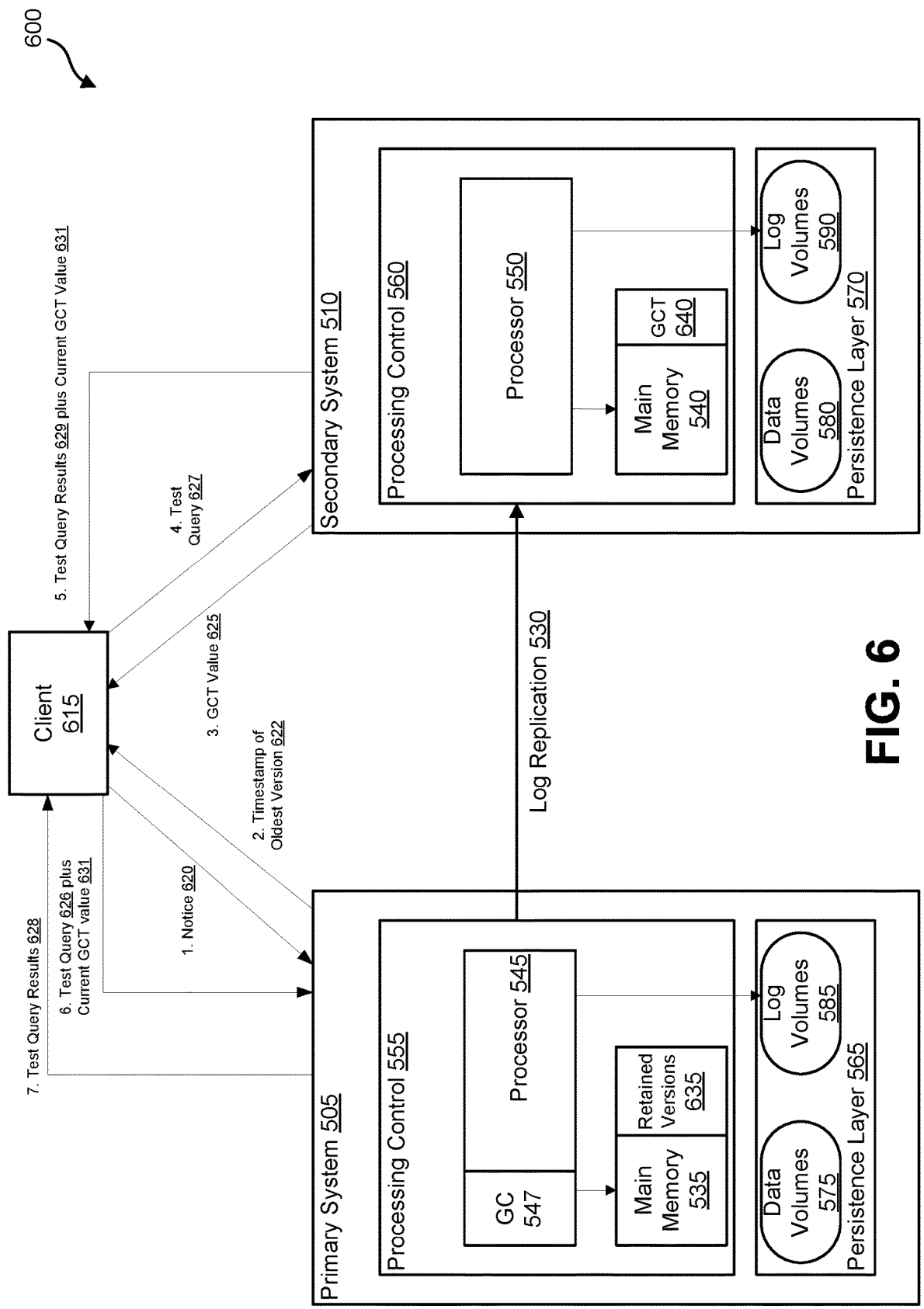
FIG. 6 illustrates an exemplary data flow progression for performing a query validation test upon an HA/DR system in accordance with the present disclosure.

FIG. 6 illustrates one possible data flow progression for performing a query validation test upon an HA/DR system 600 configured to perform load balancing operations with read service at the secondary system 510. System 600, like system 500 and system 400 may be a single instance system embodiment, such as those described in reference to FIG. 1 or a scale-out multi instance system embodiment, such as those described in reference to FIG. 2.

First, a client application 615 initiates a query validation test by issuing a query validation test notice 620 to primary system 505. The query validation test notice 620 is passed to processing control 555, wherein processes executing on processor 545 suspend garbage collection process 547. This causes the system to create and retain update versions 635 in main memory 515 during the validation test without risk of deletion. A processing control 555 process identifies the oldest retained update version within retained versions 635, and sends the timestamp 622 associated with the oldest retained version to the client 615. The client then requests, or receives, the secondary system 510 global commit timestamp value 625 obtained from a global commit timestamp variable parameter 640 of the secondary system 510, and when the global commit timestamp value 625 is equal to or greater than the oldest retained version timestamp value 622 the client 615 issues a test query 627 to the secondary system.

The secondary system 510 processing control 560 executes the query 627 in the in-memory database held in main memory 540 based on a delayed snapshot associated with the then current global commit timestamp parameter 640 value 631 to generate a return. The secondary system 510 then sends 629 the return and the then current snapshot timestamp value 631 are then sent to the client 615. The client 615 then sends a second test query 626 plus the current snapshot timestamp value 631 to the primary system 505. Primary system 505 processing control 555 executes the test query 626 in the primary in-memory database on a retained update version 635 that corresponds to the current global commit timestamp value 631 associated with the first test query results 629. This process may be referred to as time travel query execution. Then the results 628 of the second test query 626, executed by time travel query execution, are sent to the client, which compares the results for identity. If the results are identical, the system is validated. The test complete, the primary system 505 processing control 555 results garbage collection 547, which eventually deletes the obsolete retained versions 635.

In practice, a test query executed by a primary system, e.g. 505, may result in a return containing the same records as a return executed against by a secondary system 510, but each system may return the results in a different order. In this way, a direct comparison may result in a failed validation test, even though the records themselves are the same. One way to alleviate this is to always perform an specified ordering of the records when executing a test query. Another way to address this issues is to hash the return results and comparing the resulting hash values for each return. For example, when a query results in three records each record may be hashed, and the resulting three hash values may be XOR'd to obtain a single hash value. This hashing technique may be performed on the results of the test query in each database, and the resulting comparison merely compares each single hash value for identity.

Also, some database systems do not retain historical versions of table structure or schema information when the database structure is modified, for example by DDL statements. In order to enable query validation in an asynchronously replicated database including the ability to validate queries against retained versions having a historic database structure (as opposed to a current database structure as a result of a DDL operation), when garbage collection is suspended, the primary database should also retain table, or schema, structure information, or retain historic metadata snapshots to metadata access, in a way that the records associated with the retained version, e.g. 635, may be queried after a DDL operations. This may be the case when a DDL operation is performed on a primary database system, and a validation test commences before the DDL operation is replicated to the secondary database system.

Figure 7:
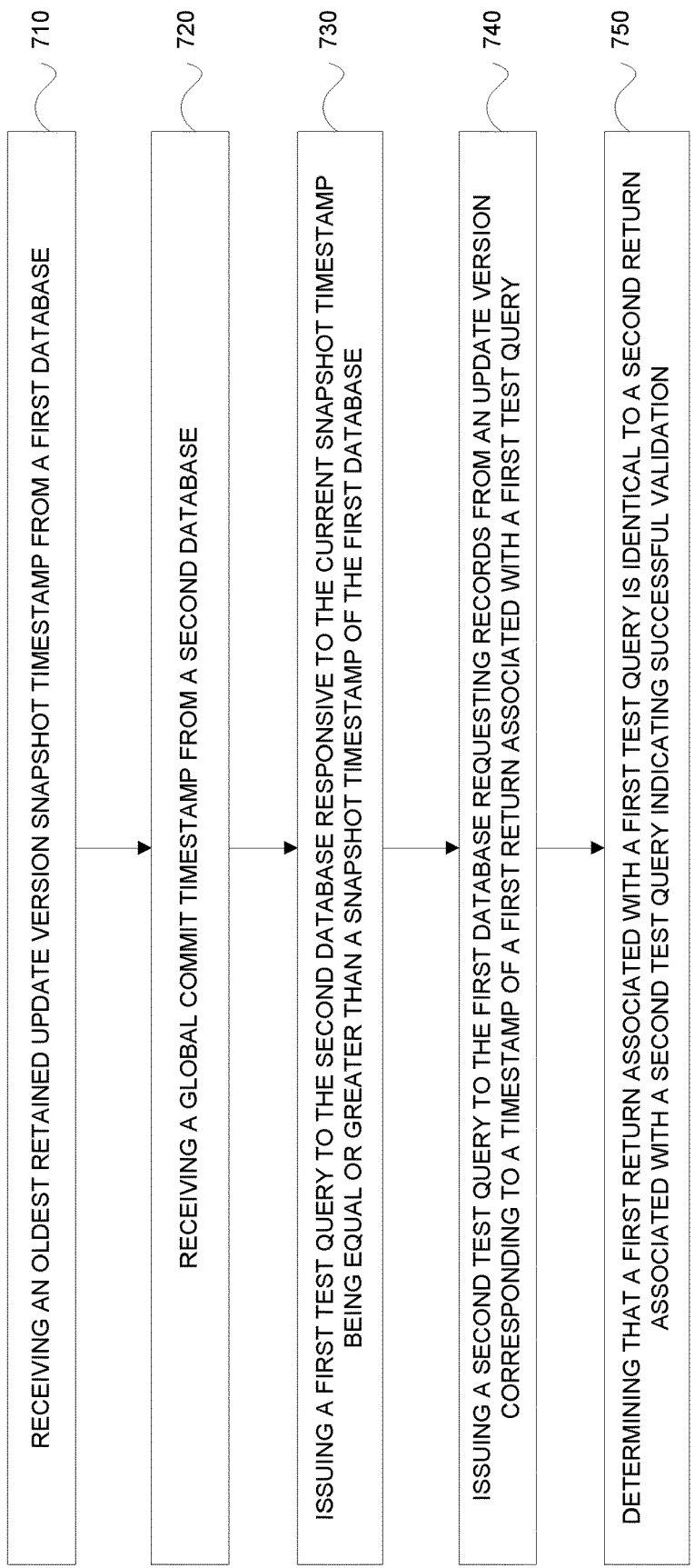
FIG. 7 is a process flow diagram illustrating performing a query validation test.

FIG. 7 is a process flow diagram illustrating an arrangement in which, at 710 an oldest retained update version snapshot timestamp is received from a first database. Thereafter, at 720, a global commit timestamp is received from a second database, indicating the most recent commit timestamp for which all previous commit transactions have been replicated in the second database. Further, at 730, a first test query is issued to the second database responsive to the global commit timestamp being equal to or greater than an update version snapshot timestamp of the first database. Then, at 740, a second test query is issued to a first database requesting records from an update version corresponding to a timestamp associated with a first test query return. A determination whether the first test query return is identical to the second test query return is made at 750, wherein identical results indicates a successful validation test.

FIG. 8 is a process flow diagram illustrating an arrangement in which, at 810, a query validation test notice is received at a first database. Thereafter, at 820, first snapshot timestamp issued responsive to the query validation test notice. At 830, a second database image version and an associated snapshot timestamp are generated responsive to executing an update transaction upon a first database image version that is associated with a first snapshot timestamp. When, at 840, the validation test timestamp is equal to the first snapshot timestamp, a test query is executed against the first database image versions. When, at 850, the validation test timestamp is equal to the second snapshot timestamp, a test query is executed against the second database image versions.

FIG. 9 is a process flow diagram illustrating an arrangement in which, at 910, a plurality of update versions are generated in a primary database system over a period of time in response to a plurality of update transactions. At 915, a plurality of transaction logs are generated by the primary database system responsive to a plurality of update transactions. At 920, garbage collection is performed upon the plurality of update versions in the primary database system. At 925, the plurality of update transactions are asynchronously replicated in a second database based on transaction logs from the primary database system thereby incrementing a global commit timestamp of the secondary database system. Garbage collection is suspended in the primary database at 930 responsive to initiation of a query validation test. Then, at 935, an oldest update version associated with an oldest update version timestamp value is identified. When a global commit timestamp of a secondary database system is greater than an identified oldest update version timestamp, at 940, a first test query is issued to a secondary database. Responsive to the first test query, at 945, a first return is received attended by a current global commit timestamp. At 950, a second test query is issued to a primary database system requesting records from a version having a snapshot timestamp equal to a value of a received current global commit timestamp. At 955, a return from the second test query is compared with a return from the first test query, and at 960 a determination is made that a first return and a second return are identical indicating a successful validation test.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computer processors forming part of at least one computing device, the method comprising:

receiving, by at least one computer processor, an oldest retained update version snapshot timestamp from a first database system;

receiving, by the at least one computer processor, a current global commit timestamp from a second database system configured to asynchronously replicate the first database system, the current global commit timestamp corresponding to a commit transaction executed in the first database system and subsequently replicated in the second database system;

issuing, by the at least one computer processor, responsive to the current global commit timestamp being equal to or greater than the oldest retained update version snapshot timestamp, a first test query against the second database system, wherein the first test query includes (i) a request for a current snapshot timestamp and (ii) a read transaction for obtaining test results for comparison between the first database system and the second database system;

issuing, by the at least one computer processor, a second test query to the primary database, wherein the second test query includes the request and the read transaction of the first test query and records resulting from the second query are associated with a target update version having a target snapshot timestamp equal to the current snapshot timestamp; and determining, by the at least one computer processor, that a first return associated with the first test query and a second return associated with the second test query are identical indicating a successful validation.

2. The method of claim 1, further comprising:
issuing, by at least one computer processor, a query validation test notice to a first database system;
suspending, by the at least one computer processor, responsive to the query validation test notice, garbage collection of update versions in the first database system.

3. The method of claim 2, wherein the query validation test notice comprises an instruction causing the first database system to suspend garbage collection of update versions in the first database system.

4. The method of claim 2, garbage collection includes:
determining, by the at least one computer processor, whether a particular update version is associated with any potential readers, and
deleting, by the at least one computer processor, responsive to a determination that the particular update version is not associated with any potential readers, the particular update version.

5. The method of claim 4, further comprising:
resuming, by the at least one computer processor, responsive to a successful validation test, garbage collection of update versions in the first database system.

6. The method of claim 1, wherein the second database system is configured to asynchronously replicate the first database system by:
receiving, at the second database system, transaction logs generated by the first database system responsive to the first database system executing update transactions, each transaction log associated with a transaction commit timestamp;
replaying, at the second database system, the transaction logs as they are received, the replaying of a particular transaction log causing an update to the second database system corresponding to a particular update executed in the first database system that caused the generation of the particular transaction log; and updating, at the second database system, responsive to replaying the particular transaction log, the current global commit timestamp by replacing a current global commit timestamp value with a transaction commit timestamp value associated with the particular transaction log.

7. The method of claim 1, wherein the first return is converted to a first hash value generated based on first records in the second database system associated with the first test query and the second return is converted to a second hash value generated based on second records in the first database system associated with the second test query, and determining that the first return and the second return are identical involves comparing the first hash value and the second hash value.

8. A method for implementation by one or more computer processors forming part of at least one computing device, the method comprising:
receiving, by at least one computer processor, a query validation test notice at a first database system comprising a first database image version;
issuing, by the at least one computer processor, responsive to the query validation test notice, a first snapshot timestamp, the first snapshot timestamp associated with the first database image version;
executing, by the at least one computer processor, an update transaction requiring one or more changes to records stored in the first database image version;
generating, by the at least one computer processor, a second database image version based on at least the first database image version and the one or more changes to records required by the update transaction, the second database image version associated with a second snapshot timestamp greater than the first snapshot timestamp;
receiving, by the at least one computer processor, a test query including a validation test timestamp equal to either the first snapshot timestamp or the second snapshot timestamp, wherein the test query includes (i) a request for the validation test timestamp and (ii) a read transaction for obtaining test results for comparison between the first database system and a second database system; and
executing, by the at least one computer processor, when the validation test timestamp is equal to the first snapshot timestamp, the test query against the first database image version; or
executing, by the at least one computer processor, when the validation test timestamp is equal to the second snapshot timestamp, the test query against the second database image version.

9. The method of claim 8, further comprising:
executing, by the at least one computer processor, a plurality of additional update transactions each causing additional changes to records stored in the first database image version, wherein generating the second database image version is further based on the additional changes to records.

10. The method of claim 9, further comprising:
generating, by the at least one computer processor, for each additional update transaction, a corresponding additional database image version, each additional database image version associated with an additional snapshot timestamp greater than the first snapshot timestamp and less than the second snapshot timestamp.

11. The method of claim 10, wherein the one or more changes to records stored in the first database image version includes changes to the table structure or database schema, and for each of the first database image version, the second database image version, or the additional database image versions any necessary table structure information or any necessary database schema is stored to enable executing queries against each of the first database image version, the second database image version, or the additional database image versions.

12. The method of claim 8, wherein the update transaction requiring one or more changes to records stored in the first database image version is responsive to a statement received from a client application.

13. The method of claim 8, further comprising:
performing, by the at least one computer processor, garbage collection of unnecessary database image update versions, wherein an unnecessary database image update version is not the most recent database update version and has no associated potential readers, wherein garbage collection of the unnecessary database image update versions comprises deleting the unnecessary database image update versions; and
suspending, by the at least one computer processor, responsive to the query validation test notice, the performance of garbage collection.

14. The method of claim 8, further comprising:
returning, by the at least one computer processor, responsive to the test query either:
when the validation test timestamp is equal to the first snapshot timestamp, records associated with the test query from the first database image version; or
when the validation test timestamp is equal to the second snapshot timestamp, records associated with the test query from the second database image version.

15. The method of claim 14, further comprising:
receiving, by the at least one computer processor, an indication of a successful validation test indicating that the returned records are identical to records obtained from a second database system configured to asynchronously mirror the first database system; and
resuming, by the at least one computer processor, garbage collection of unnecessary database image update versions.

16. The method of claim 15, wherein resuming garbage collection causes the first database image update version and the second database image update version to be deleted.

17. A method for implementation by one or more computer processors forming part of at least one high availability disaster recovery database system, the method comprising:
generating, by the at least one computer processor, a plurality of update version snapshots in a primary database system responsive to a plurality of update transactions, each update version snapshot associated with one of the plurality of update transactions and having a corresponding snapshot timestamp;
generating, by the at least one computer processor, a plurality of transaction logs responsive to the plurality of update transactions, each update transaction log associated with one of the plurality of update transactions and the corresponding snapshot timestamp;
performing, by the at least one computer processor, garbage collection upon the plurality of update versions in the primary database system, wherein garbage collection deletes any update versions that are not a most current update version and that are not associated with a potential reader;
replicating, by the at least one computer processor, the plurality of update transactions in a secondary database system based on the plurality of transaction logs, wherein replication in the secondary database system occurs asynchronously from the execution of the plurality of transactions in the primary database system, and wherein replication of a particular update transaction in the secondary database system updates a value of a current snapshot timestamp parameter in the secondary database system with a particular snapshot timestamp associated with the particular update transaction;
suspending, by the at least one computer processor, responsive to a query validation test, the garbage collection of the plurality of update versions in the primary database system;
identifying, by the at least one computer processor, responsive to the query validation test, an oldest update version snapshot timestamp corresponding to the oldest retained update version of the plurality of update versions;
issuing, by the at least one computer processor, a first test query against the secondary database system when the secondary database system current snapshot timestamp parameter is greater than or equal to the oldest update version snapshot timestamp, wherein the first test query includes (i) a request for the current snapshot timestamp parameter and (ii) a read transaction for obtaining test results for comparison between the primary database system and the secondary database system;
receiving, by the at least one computer processor, responsive to the first test query, a first return from the secondary database system including the value of the current snapshot timestamp parameter;
issuing, by the at least one computer processor, a second test query against a target update version in the first database, wherein the second test query comprises the request and the read transaction of the first test query, the target update version having a corresponding target snapshot timestamp equal to the value of the current snapshot timestamp parameter;
comparing, by the at least one computer processor, a second return, responsive to the second test query, with the first return; and
determining, by the at least one computer processor, that the first return and the second return are identical indicating a successful validation test.

18. The method of claim 17, further comprising:
generating, by the at least one computer processor, a first hash value based on the first return;
generating, by the at least one computer processor, a second hash value based on the second return, wherein comparing the second return with the first return comprises comparing the first hash value with the second hash value.

19. The method of claim 17, further comprising:
generating, by the at least one computer processor, the first test query and the second test query;
ordering, by the at least one computer processor, the first return according to a first parameter; and
ordering, by the at least one computer processor, the second return according to the first parameter.

20. The method of claim 17, further comprising:
  storing, by the at least one computer processor, responsive to receiving an update transaction requesting an update transaction requiring modification of the first database structure, database structure information corresponding to an update version created prior to execution of the update transaction request to enable execution of test queries against the update version created prior to execution of the update transaction request.

* * * * *